United States Patent
Gadgil et al.

(10) Patent No.: US 10,902,601 B2
(45) Date of Patent: Jan. 26, 2021

(54) SEGMENT-BASED RESHAPING FOR CODING HIGH DYNAMIC RANGE VIDEO

(71) Applicant: DOLBY LABORATORIES LICENSING CORPORATION, San Francisco, CA (US)

(72) Inventors: Neeraj J. Gadgil, Sunnyvale, CA (US); Yee Jin Lee, San Jose, CA (US); Qian Chen, San Jose, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/462,496

(22) PCT Filed: Jan. 16, 2018

(86) PCT No.: PCT/US2018/013904
§ 371 (c)(1),
(2) Date: May 20, 2019

(87) PCT Pub. No.: WO2018/136432
PCT Pub. Date: Jul. 26, 2018

(65) Prior Publication Data
US 2019/0272643 A1 Sep. 5, 2019

Related U.S. Application Data

(60) Provisional application No. 62/447,517, filed on Jan. 18, 2017.

(30) Foreign Application Priority Data

Jan. 18, 2017 (EP) .................................... 17152004

(51) Int. Cl.
*G06T 7/11* (2017.01)
*G06T 7/143* (2017.01)
(Continued)

(52) U.S. Cl.
CPC .................. *G06T 7/11* (2017.01); *G06T 3/40* (2013.01); *G06T 5/009* (2013.01); *G06T 5/40* (2013.01);
(Continued)

(58) Field of Classification Search
CPC . G06T 7/11; G06T 7/143; G06T 7/136; G06T 7/174; G06T 9/00; G06T 5/009; G06T 5/40; G06T 5/50; G06T 3/40
(Continued)

(56) References Cited

U.S. PATENT DOCUMENTS 8,774,553 B1\* 7/2014 Winn ...................... G06T 5/008
382/274
8,811,490 B2 8/2014 Su
(Continued)

FOREIGN PATENT DOCUMENTS

WO 2003077549 9/2003
WO 2015123067 A1 8/2015
(Continued)

OTHER PUBLICATIONS

ITU-R BT.1886 "Reference Electro-Optical Transfer Function for Flat Panel Displays Used in HDTV Studio Production" Mar. 2011.
(Continued)

*Primary Examiner* — CongVan Tran

(57) ABSTRACT

Given a standard-dynamic range (SDR) video input, techniques for generating and compressing composer metadata describing inverse luma and chroma reshaping functions are described. Given the SDR input, the composer metadata allow a decoder to generate a corresponding output in
(Continued)

high-dynamic range. Three techniques are proposed: a static, sequence-based, architecture, a two-stage, scene-based, distributed solution with a centralized post-processing method, and a single-stage distributed solution using overlapped segments. Techniques to reduce the amount of transmitted composer metadata are also described.

14 Claims, 7 Drawing Sheets

(51) Int. Cl.

| | | |
|---|---|---|
| G06T 7/136 | (2017.01) | |
| G06T 7/174 | (2017.01) | |
| G06T 9/00 | (2006.01) | |
| G06T 5/00 | (2006.01) | |
| G06T 5/40 | (2006.01) | |
| G06T 5/50 | (2006.01) | |
| G06T 3/40 | (2006.01) | |
| G06T 7/50 | (2017.01) | |
| H04N 19/186 | (2014.01) | |
| H04N 19/98 | (2014.01) | |
| H04N 19/87 | (2014.01) | |
| H04N 19/30 | (2014.01) | |

(52) U.S. Cl.
CPC ............... *G06T 5/50* (2013.01); *G06T 7/136* (2017.01); *G06T 7/143* (2017.01); *G06T 7/174* (2017.01); *G06T 7/50* (2017.01); *G06T 9/00* (2013.01); *H04N 19/186* (2014.11); *H04N 19/30* (2014.11); *H04N 19/87* (2014.11); *H04N 19/98* (2014.11)

(58) Field of Classification Search
USPC ........................................................ 382/173
See application file for complete search history.

(56) References Cited

U.S. PATENT DOCUMENTS

| | | | | |
|---|---|---|---|---|
| 10,217,197 | B2* | 2/2019 | Mantiuk | G09G 5/02 |
| 2004/0131273 | A1* | 7/2004 | Johnson | G06T 5/40 |
| | | | | 382/254 |
| 2005/0031201 | A1* | 2/2005 | Goh | G06T 5/009 |
| | | | | 382/169 |
| 2006/0239581 | A1* | 10/2006 | Neuman | G06T 5/40 |
| | | | | 382/274 |
| 2008/0170798 | A1* | 7/2008 | Jia | H04N 21/4318 |
| | | | | 382/274 |
| 2009/0257652 | A1* | 10/2009 | Liu | H04N 9/73 |
| | | | | 382/167 |
| 2014/0029675 | A1 | 1/2014 | Su | |
| 2016/0065975 | A1* | 3/2016 | Su | H04N 19/179 |
| | | | | 375/240.01 |
| 2016/0253792 | A1 | 9/2016 | Xu | |
| 2016/0358319 | A1 | 12/2016 | Xu | |
| 2018/0098094 | A1* | 4/2018 | Wen | H04N 19/136 |

FOREIGN PATENT DOCUMENTS

| | | |
|---|---|---|
| WO | 2015130797 | 9/2015 |
| WO | 2016040255 | 3/2016 |
| WO | 2018049332 | 3/2018 |
| WO | 2018049335 | 3/2018 |

OTHER PUBLICATIONS

Rolland, J. P., et al.,"Fast Algorithms for Histogram Matching: Application to Texture Synthesis" Journal of Electronic Imaging, vol. 9 No. 1, Jan. 2000, pp. 39-45 (7 pgs.).

SMPTE ST 2084:2014 "High Dynamic Range EOTF of Mastering Reference Displays".

Zhu, D., "Overlapping Boundary Based Multimedia Slice Transcoding Method and Its System for Medical Video and Traffic Video" Multimedia Tools and Applications, Kluwer Academic Publishers, vol. 75 No. 22, Jan. 2016, pp. 14233-14246 (14 pgs.).

* cited by examiner

SEGMENT-BASED RESHAPING FOR CODING HIGH DYNAMIC RANGE VIDEO

CROSS-REFERENCE TO RELATED APPLICATIONS

This application claims the benefit of priority from U.S. Provisional Patent Application 62/447,517 and European Patent Application 17152004.2, both filed on Jan. 18, 2017, and each incorporated by reference.

TECHNOLOGY

The present invention relates generally to images. More particularly, an embodiment of the present invention relates to the coding of video signals with high dynamic range using segment-based reshaping.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, in Ref. [1], ITU Rec. BT. 1886 defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 (Ref. [2]). In general, without limitation, the methods of the present disclosure relate to any dynamic range higher than SDR.

As used herein, the term "reshaping" refers to a pre-processing operation on an HDR image, such as scaling, quantization, and the like, to map it from its original bit depth to an image of the same or lower bit depth, to allow for more efficient coding using existing coding standards and devices. 'Backward or Inverse reshaping' parameters used by an encoder may be communicated to a receiver as part of the coded bitstream using metadata so that a compliant decoder may apply an 'inverse' or 'backward reshaping' operation to reconstruct the original signal at its full dynamic range. Reshaping may be applied to any one or all of the color components of an HDR signal. In some embodiments, reshaping may also be constrained by the requirement to preserve on the decoded image the artistic intent of the original, for example, in terms of the accuracy of colors or "look," as specified by a colorist under the supervision of the director.

Existing reshaping techniques are typically scene-based. As used herein, the term "scene" for a video sequence (a sequence of frames/images) may relate to a series of consecutive frames in the video sequence sharing similar luminance, color and dynamic range characteristics. Scene-based methods work well in video-workflow pipelines which have access to the full scene; however, it is not unusual for content providers to use cloud-based multiprocessing, where, after dividing a video stream into segments, each segment is processed independently by a single computing node in the cloud. As used herein, the term "segment" denotes a series of consecutive frames in a video sequence. A segment may be part of a scene or it may include one or more scenes. Thus, processing of a scene may be split across multiple processors. To improve existing coding schemes, as appreciated by the inventors here, improved techniques for segment-based reshaping of HDR video are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
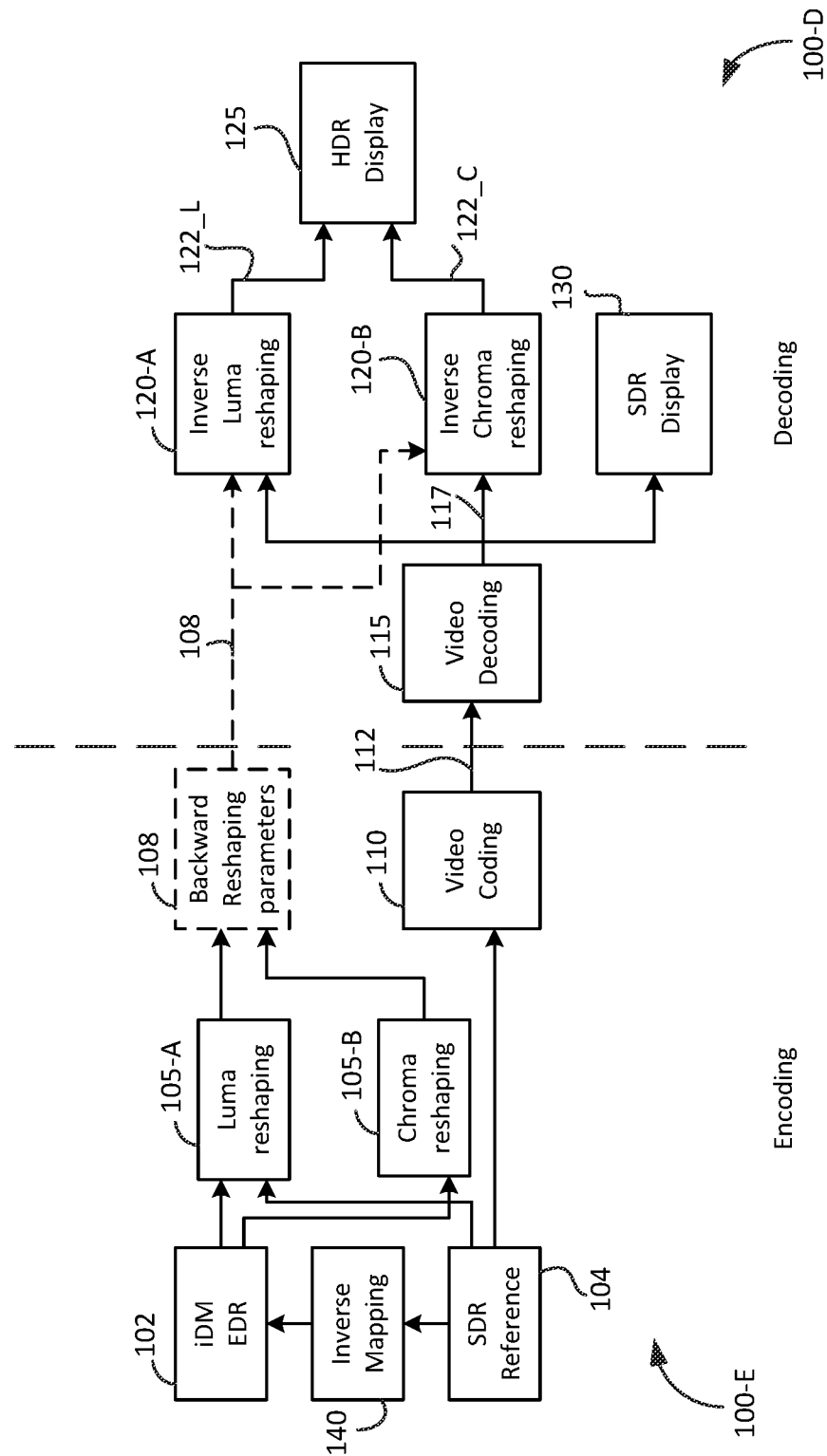
FIG. 1 depicts an example process for data coding and decoding using reshaping techniques according to an embodiment of this invention.

Segment-based reshaping techniques for high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to generating composer metadata which are transmitted from an encoder to a decoder for constructing in the decoder HDR images based on received SDR images. In a first embodiment, a processor accesses a database of representative input video clips in a first dynamic range (e.g., SDR) and converts them to output clips in a second dynamic range, higher than the first dynamic range (e.g., EDR or HDR). The processor computes a first histogram of luminance pixel values in the first dynamic range based on the frames of the input video clips, and computes a second histogram of luminance pixel values in the second dynamic range based on the frames of the output video clips. The processor computes a first luma cumulative distribution function (CDF) for luma pixel values in the first dynamic range based on the first histogram and a second luma CDF for luminance pixel values in the second dynamic range based on the second histogram. The processor computes a luma mapping based on the first and second CDFs for mapping luminance values of pixels in the first dynamic range into the second dynamic range. Based on statistical data gathered from the input and output video data and a chroma prediction model, the processor computes a chroma mapping for mapping chroma values of pixel values in the first dynamic range into chroma values in the second dynamic range. Then, the processor generates static composer metadata for all frames to be encoded in the first dynamic range based on the luma mapping and the chroma mapping.

In a second embodiment, a processor receives an input video signal in a first dynamic range and it divides it into segments. Each segment is distributed to a separate node processor. A node processor converts each frame of the input video signal in its segment into a corresponding frame of a second video signal in a second dynamic range, wherein the second dynamic range is higher than the first dynamic range. The node processor generates statistical data based on the input video frames and the second video frames in its segment. The node processor collects scene cut information for the frames of the input video frames in its segment. In a post-processor, the post-processor identifies a scene boundary based the scene cut information from one or more segments. The post-processor generates updated statistics based on the generated statistics of all frames within the scene boundary, and determines a) a luma mapping for mapping luminance values of the frames within the scene boundary from the first dynamic range into the second dynamic range based on the updated statistics, and b) a chroma mapping for mapping chroma values of the frames within the scene boundary from the first dynamic range into the second dynamic range based on the updated statistics. Then, the post-processor generates composer metadata for the frames within the scene boundary based on the luma mapping and the chroma mapping.

In a third embodiment, a processor receives an input video signal in a first dynamic range and divides it into segments, wherein each segment comprises primary frames (510) and secondary (padded) frames, wherein for two consecutive segments, padded frames for one of the segments overlap with the primary frames of the other segment. Each of the segments is processed by a node processor. The node processor converts each of the primary and padded frames of the input video signal in its segment into corresponding primary and padded frames of a second video signal in a second dynamic range (417), wherein the second dynamic range is higher than the first dynamic range. The node processor gathers statistical data (420) based on the input video frames and the second video frames in its segment and collects scene cut information (425) for the frames of the input video frames in its segment. The node processor generates a first sub-segment of the input video comprising the primary frames in its segment and a first part of the padded frames in its segment, then, for each frame in the first sub-segment of the input video (430): a) it computes a first support frame set (530) of smoothed statistical data based on a first sliding window centered on the frame of the first sub-segment and adjusted based on scene cuts in the segment, and b) determines a first luma mapping for mapping luminance values of the frame in the first sub-segment from the first dynamic range into the second dynamic range based on the statistical data and the first support frame set. Next, the node processor, for each primary frame in the segment of the input video (435): a) computes a second support frame set (545) of smoothed first luma mappings based on a second sliding window centered on the primary frame and adjusted based on scene cuts in the segment, b) determines a second luma mapping for mapping luminance values of the primary frame from the first dynamic range into the second dynamic range based on the first mapping and the second support frame set, and c) determines a chroma mapping for mapping chroma values of the primary frame from the first dynamic range into chroma values in the second dynamic range based on the statistical data and the second support frame set. Then, the node processor generates composer metadata for the frame in the segment based on the second luma mapping and the chroma mapping.

Example Video Delivery Processing Pipeline

Signal Reshaping

Currently, most digital interfaces for video delivery, such as the Serial Digital Interface (SDI), are limited to 12 bits per pixel per component. Furthermore, most practical implementations of compression standards, such as H.264 (or AVC) and H.265 (or HEVC), are limited to 10-bits per pixel per component. Therefore, efficient encoding and/or quantization is required to support HDR content, with dynamic range from approximately 0.001 to 10,000 cd/m² (or nits), within existing infrastructures and compression standards.

FIG. 1 depicts an example process (100) for data coding (100-E) and decoding (100-D) using luma and chroma reshaping according to an embodiment of this invention. In an encoder (100-E), a video sequence may be available in both high dynamic range (EDR, 102) and standard dynamic range (SDR, 104) formats. In an embodiment, the EDR sequence (referred herein also as iDM EDR) may be generated based on the SDR sequence using an inverse mapping process (iDM) (140). Examples for such a mapping process are given in Ref. [4] and Ref. [5]. Input (102) may be coded according to a certain EOTF (e.g., gamma, ST 2084, and the like).

Given the input EDR and SDR signals, luma reshaping (105-A) and chroma reshaping (105-B) processes, as will be described herein, may be applied to generate parameters (108) for backward or inverse reshaping functions (120) which when applied to the SDR input in a decoder will generate the EDR input (102).

After reshaping (105), the original input SDR video signal (104) is passed to encoding block (110) for delivering downstream to decoding and playback devices such as television sets, set-top boxes, movie theaters, and the like. In some embodiments, coding block (110) may include audio and video encoders, such as those defined by ATSC, DVB, DVD, Blu-Ray, and other delivery formats, to generate coded bit stream (112). Coded data (112) and the backward reshaping parameters (108) are multiplexed into a coded bitstream to be stored or delivered to decoding devices.

In a receiver (100-D), the coded data (112) is decoded by decoding unit (115) to generate a decoded signal (117) representing an identical or close approximation of SDR signal (104).

In a backward-compatible SDR decoder, decoded signal (117) may be displayed directly to SDR display (130). In an HDR decoder, following decoding (115), decoded signal (117) may be processed by a backward or inverse reshaping function (120) generated using the received backward reshaping parameters (108). Inverse reshaping converts the received SDR signal to an approximation of the (higher) dynamic range signal (102), to be displayed on an HDR display (125). Inverse reshaping may include separate inverse luma reshaping (120-A) and chroma reshaping (120-B). Depending on the transformations of the reshaper (105), inverse reshaping (120) may also include additional (inverse) processes, such as inverse tone-mapping, color transformations, and the like. In some embodiments, the backward or inverse reshaping function (120) may be integrated with a de-quantizer in decoder (115), e.g., as part of the de-quantizer in an AVC or HEVC video decoder. In some embodiments, information about the backward reshaping parameters (108) may be communicated to downstream devices (such as decoders) using metadata, SEI messaging, and the like.

Luma and Chroma Reshaping and Composer Metadata

As used herein, the term "composer metadata" (CM) denotes any metadata that are communicated from an encoder (100-E) to a decoder (100-D) to support the reconstruction (compositing) of EDR data (122). Such metadata include all the backward reshaping parameters (108) needed for inverse or backward reshaping (120) in the decoder.

Let $f_L(I)$ denote a forward luma reshaping function and let $f_L^{-1}(I)$ denote its inverse, which when applied to the luma component of the decoder SDR data (117) generates the luma component (122_L) of the estimated EDR output (122). In an embodiment, the $f_L^{-1}(I)$ function may be communicated as a piece-wise function. Such a function can be fully represented by a) a set of pivot points dividing the range of input codewords in the SDR input into segments, b) the order of the polynomial in each segment, and c) the polynomial coefficients in each segment.

In an embodiment, chroma reshaping may be performed using a multivariate, multiple regression (MMR) predictor. Examples of such MMR predictors may be found in U.S. Pat. No. 8,811,490 (Ref. [3]). Such a predictor is characterized by a backward reshaping matrix M, which, when applied to the decoded SDR data (117) generates the chroma components (122_C) of the estimated EDR output.

Thus, without limitation, in an embodiment, the composer metadata (108) may comprise a parametric representation of $f_L^{-1}(I)$ and a backward reshaping matrix M. Composer metadata may be updated at different levels of time intervals, such as: once for each sequence, for every scene, for each frame, or for clusters or groups of frames. Generating composer metadata for each frame may increase overall video quality, but requires higher computational resources on the encoder and increased overhead in the overall bitrate. In this invention, three different techniques for generating composer metadata are presented, each one addressing different trade-offs. The methods are A static luma and chroma reshaping architecture. This method is suitable for environments with very limited computation resources and has the least overhead for composer metadata.

A two-stage distributed solution using a centralized post-processing method. This method provides a low overhead for composer metadata and is best suitable for a parallel-based computation environment with a very powerful post-processing node.

A single-stage distributed solution using overlapped segments of frames. This method provides moderate overhead for composer metadata, which can be further reduced using a novel CM-compression technique.

Each of these methods will be discussed in more detail next.

Static Reshaping Architecture

Under the static compositing method, the composer metadata are always the same (fixed). Given a database of representative SDR reference clips, one may generate a corresponding set of EDR pictures using any of available inverse mapping techniques (140). Then, based on this pair of SDR/EDR data, one can generate a fixed set of composer metadata.

For luma reshaping, in an embodiment, one may generate the luma reshaping function using a method based on matching the cumulative distribution functions (CDF) of the SDR/EDR pairs (Ref. [6]).

Let $s_{ji}^y$, $s_{ji}^{c0}$, and $s_{ji}^{c1}$ denote the color components of the i-th pixel value at the j-th frame in the SDR data, where y denotes luminance (e.g., Y of YCbCr) and c0, c1, denote chrominance (e.g., Cb and Cr in YCbCr). Let $v_{ji}^y$, $v_{ji}^{c0}$, and $v_{ji}^{c1}$ denote the color components of the corresponding i-th pixel value at the j-th frame in the inverse DM (iDM) EDR data. Denote as P the number of pixels in each frame. Let the bit depth in the SDR signal be denoted as SDR_bitdepth, and let the bit depth in the EDR signal be denoted as EDR_bitdepth, then, the number of all possible SDR and EDR values is given by $N^S = 2^{SDR\_bitdepth}$ and $N^V = 2^{EDR\_bitdepth}$, respectively.

As described in Ref. [6], CDF-based luma reshaping maps SDR values to EDR values so that their corresponding cumulative density functions match. To accomplish this, typically, the following computations are needed:

Optionally, to reduce the computation load, divide the input SDR codewords into M non-overlapping bins (e.g., M=16, 32, or 64) with equal interval $w_b$ (e.g., for 16-bit input data, $w_b$=65,536/M) to cover the whole normalized dynamic range (e.g., (0,1]). Denote the number of bins in SDR and EDR as $M^S$ and $M^V$, respectively, and denote the corresponding intervals as $w_{bS}$ and $W_{bV}$.

Compute histograms for the luminance values of both the SDR and iDM EDR inputs ($h_{j,s_{ji}^y}^s$, $h_{j,v_{ji}^y}^v$)

Compute, using the histograms, normalized (e.g., in [0 1]) CDFs for both SDR and iDM EDR inputs $$\left(\text{e.g., } c_b^s = \frac{1}{P}\sum h_b^s, c_b^v = \frac{1}{P}\sum h_b^v\right)$$

Apply CDF mapping; for each SDR sample point, find its CDF value and then identify the EDR value whose CDF covers the SDR CDF value. Let this mapping be denoted as $\tilde{T}_b$; For example, for k such that $c_{k-1}^v \le c_b^s \le c_b^v$, $$\tilde{T}_b = (k-1) + \frac{c_b^s - c_{k-1}^v}{c_k^v - c_{k-1}^v}. \tag{1}$$

Figure 2:
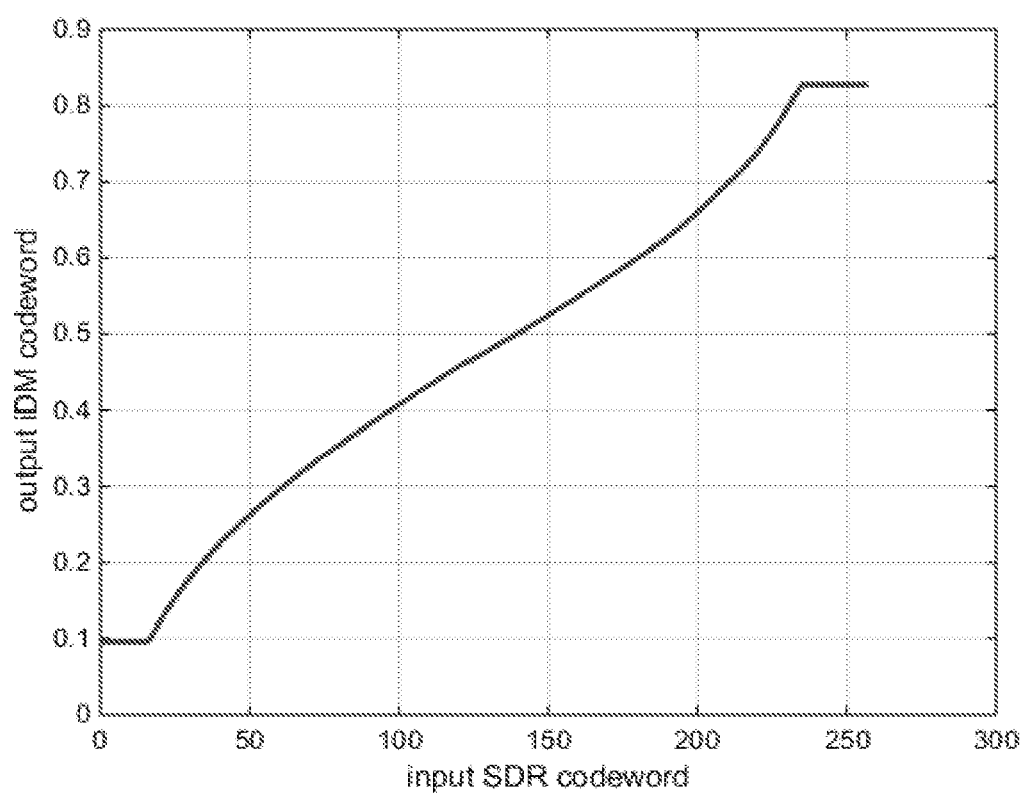
FIG. 2 depicts an example of a backward luma reshaping function according to an embodiment of this invention.

That is, all SDR values in bin (or value) b are mapped to the EDR value $\tilde{T}_b$ Given the set of $\tilde{T}_b$ values, their values can be clipped and smoothed so that they are better represented by a piece-wise representation, to generate the final mapping $T_b$ Annex A provides in pseudocode an example implementation of the steps described above. FIG. 2 depicts an example SDR-to-EDR reshaping function for 8-bit SDR input values according to an embodiment using the steps described above and in Annex A.

Let a pixel in the SDR domain be denoted as the vector $$s_{ji} = \begin{bmatrix} s_{ji}^Y \\ s_{ji}^{c0} \\ s_{ji}^{c1} \end{bmatrix}.$$

Given an MMR prediction model, one can construct the corresponding MMR polynomial vector $\bar{s}_{ji}$, based on combinations of the component values in $s_{ji}$. For example, in an embodiment, using a second order with cross-products MMR representation, the vector $\bar{s}_{j,i}^T$ may be expressed using 15 values as $$\begin{aligned}\bar{s}_{j,i}^T = [&1 \; s_{j,i}^Y \; s_{j,i}^{C0} \; s_{j,i}^{C1} \\ &(s_{j,i}^Y)^2 \; (s_{j,i}^{C0})^2 \; (s_{j,i}^{C1})^2 \\ &(s_{j,i}^Y s_{j,p}^{C0}) \; (s_{j,i}^Y s_{t,j,i}^{C1}) \; (s_{j,i}^{C0} s_{j,i}^{C1}) \\ &(s_{j,i}^Y)^2 (s_{j,i}^{C0})^2 \; (s_{j,i}^Y)^2 (s_{j,i}^{C1})^2 \; (s_{j,i}^{C0})^2 (s_{j,i}^{C1})^2 \\ &(s_{j,i}^Y s_{j,i}^{C0} s_{ji}^{C1}) \; (s_{j,i}^Y s_{j,i}^{C0} s_{j,i}^{C1})^2].\end{aligned} \tag{2}$$

In equation (2), in some embodiments, some terms may be removed to reduce the computational load. For example, one may use in the model only one of the chroma components or one may eliminate completely certain high-order cross components. Without limitation, alternative linear or non-linear predictors may also be employed.

Let the chroma components of the iDM EDR signal be denoted as $$v_{ji} = \begin{bmatrix} v_{ji}^{c0} \\ v_{ji}^{c1} \end{bmatrix}.$$

Denote the predicted chroma values via backward MMR as $$\hat{v}_{ji} = \begin{bmatrix} \hat{v}_{ji}^{c0} \\ \hat{v}_{ji}^{c1} \end{bmatrix}.$$

In chroma reshaping, the goal is to generate an MMR backward reshaping matrix, M, such that the predicted EDR value, $\hat{v}_{ji}$, is closest to $v_{ji}$. For a picture with P chroma pixels, let:

$$\hat{V}_j = \begin{bmatrix} \hat{v}_{j0}^T \\ \hat{v}_{j1}^T \\ \vdots \\ \hat{v}_{j,P-1}^T \end{bmatrix}, V_j = \begin{bmatrix} v_{j0}^T \\ v_{j1}^T \\ \vdots \\ v_{j,P-1}^T \end{bmatrix}, \text{ and } \bar{S}_j = \begin{bmatrix} \bar{s}_{j0}^T \\ \bar{s}_{j1}^T \\ \vdots \\ \bar{s}_{j,P-1}^T \end{bmatrix}.$$

Let the predicted HDR value (122_C) be expressed as $$\hat{V}_j = \begin{bmatrix} \hat{v}_{j0}^T \\ \hat{v}_{j1}^T \\ \vdots \\ \hat{v}_{j,P-1}^T \end{bmatrix} = \bar{S}_j M,$$

then, for an entire database with F frames, one would like to derive the matrix M to minimize the overall distortion within the same scene:

$$\arg\min_M \sum_{j=0}^{F-1} \|V_j - \hat{V}_{t,j}\|^2 = \arg\min_M \sum_{j=0}^{F-1} \|V_j - \overline{S}_j M\|^2. \quad (3)$$

The solution to equation (3) can be obtained by obtaining the statistics for each frame j $$A_j = \overline{S}_j^T \overline{S}_j,$$

$$B_j = \overline{S}_j^T V_j, \quad (4)$$

and then accumulating these values for all frames in the database, as in:

$$A = \sum_{j=0}^{F-1} A_j,$$

$$B = \sum_{j=0}^{F-1} B_j. \quad (5)$$

Then, the static chroma backward reshaping parameters can be obtained via $$M = (A)^{-1}(B). \quad (6)$$

Using the static reshaping algorithm, the overhead for composer metadata is very small since the same composer metadata are applicable to the whole video sequence. This low overhead may come at the expense of lower overall quality. For example, the reconstructed EDR images may look brighter than the reference iDM EDR data and some detail may be lost in the dark areas. Color accuracy may also be compromised.

Two-Stage, Scene-Based, Distributed Reshaping

Figure 3:
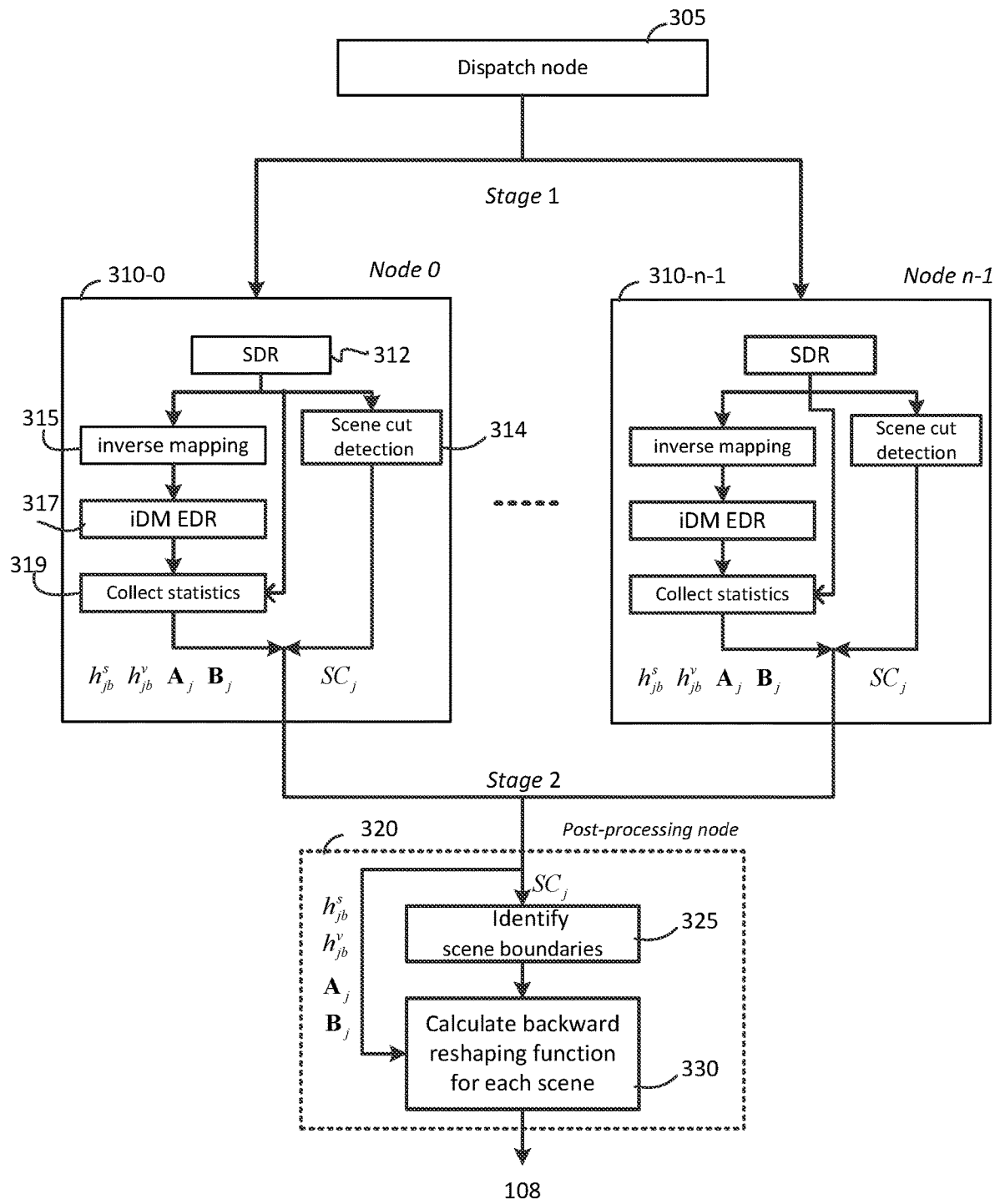
FIG. 3 depicts an example of a two-stage distributed reshaping process according an embodiment of this invention.

FIG. 3 depicts an example process for generating composer metadata using a two-stage, distributed, method. This method allows for creating new composer metadata for each scene in the video sequence, thus allowing for better luminance and color accuracy than the static reshaping method, at the cost of higher overhead for the composer metadata.

In an embodiment, the two-stage reshaping method may be deployed on a cloud-based, multi-processing computing system. In stage 1, a center dispatch node (305), may dispatch for processing to n parallel nodes (310) a fixed number of frames of the SDR input. This set of frames may be part of one or more scenes. Optionally, some frames in node n may overlap with frames in neighbor nodes to improve scene-cut detection.

As depicted in FIG. 3, given a segment of input SDR data (312), each node (310-0, 310-n-1) performs the following operations: a) inverse mapping (140, 315) to generate the corresponding iDM EDR frames (317) b) statistics collection (319) (e.g., generate luminance histograms $\{h_{jb}^s\}$, $\{h_{jb}^v\}$ and chroma-based matrices $\{A_j\}$, $\{B_j\}$) as discussed in the static-reshaping method c) if scene-cut information is not available as part of the SDR video metadata or from the central dispatch processor, scene-cut detection (314) to determine whether each frame corresponds to a scene cut (e.g., if frame j starts a new scene, then $SC_j = 1$). Scene-cut information and frame-statistics information will be sent for further processing to a central post-processing node (320).

In the second stage, the post-processing node (320) identifies each scene boundary using the received $SC_j$ information, and for each scene generates the appropriate metadata for the luma and chroma backward reshaping functions using the same techniques as described earlier (e.g., equations (1)-(6)), but by taking into consideration only the statistical data generated within each scene. For example, let a scene (k) be determined in step (325) to be between frames $fs$ and $fe$. Then updated SDR and EDR histograms for scene k may be generated as:

$$h_b^s = \sum_{j=fs}^{fe} h_{jb}^s,$$

$$h_b^v = \sum_{j=fs}^{fe} h_{jb}^v, \quad (7)$$

and a luma reshaping function for the k-th scene may be generated in step (330) as described earlier. Similarly, updated chroma-related matrices may be computed as $$A = \sum_{j=fs}^{fe} A_j,$$

$$B = \sum_{j=fs}^{fe} B_j, \quad (8)$$

and the optimal reshaping matrix $M^k$ may be generated using equation (6).

The two-stage approach enables better overall picture quality and at smaller composer metadata overhead than updating the CM data on each frame; however, parallel processing is limited to only collecting statistics, and a powerful post-processing node is required to generate the scene-based composer metadata. A more compute-efficient method is discussed next.

Single-Stage, Segment-Based, Distributed Reshaping

Figure 4:
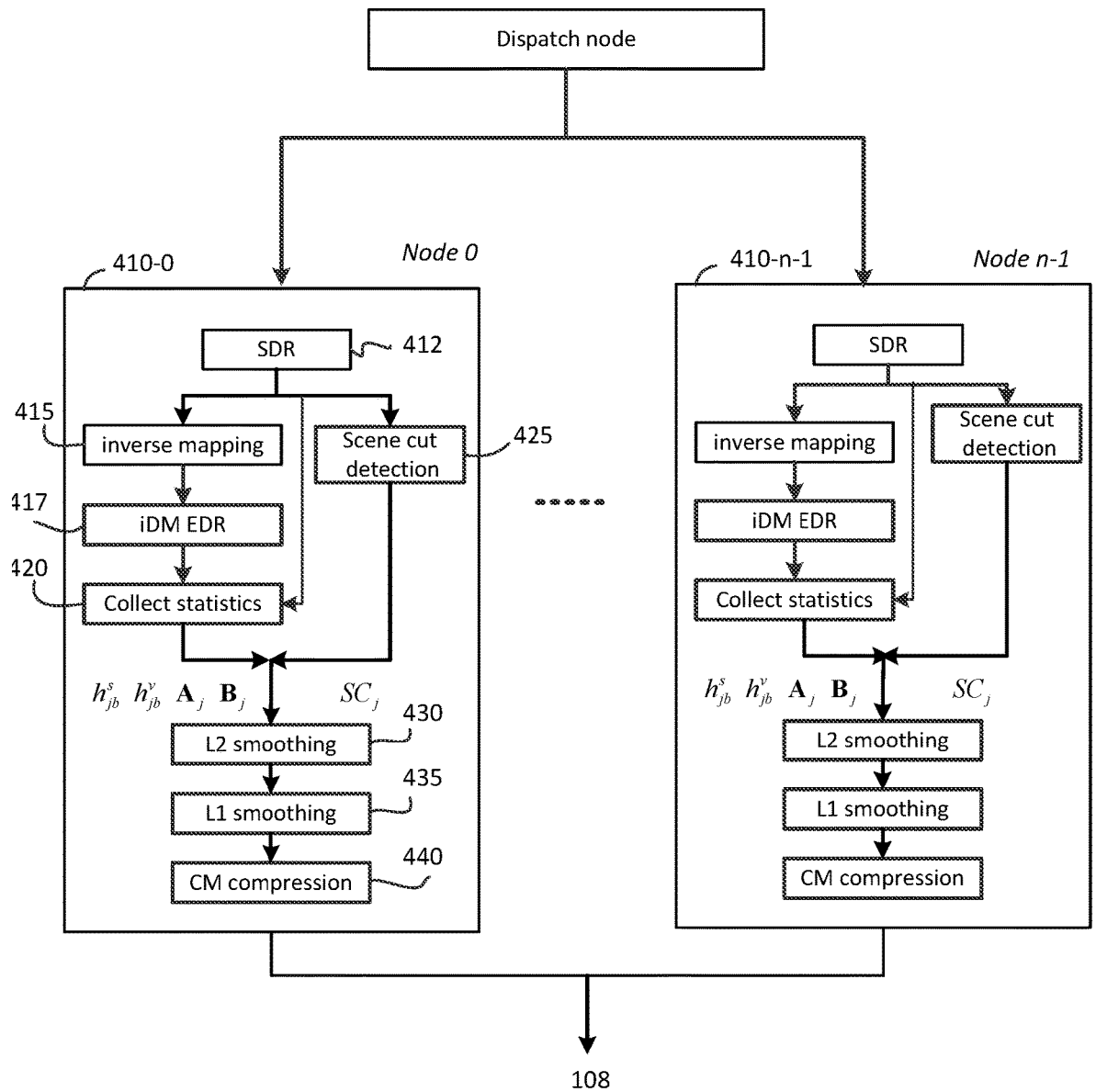
FIG. 4 depicts an example of a single-stage distributed reshaping process according to an embodiment of this invention.

FIG. 4 depicts an example process for generating composer metadata using a single-stage, distributed, method according to an embodiment. This architecture removes the need for a central post-processor at the expense of increased processing at each node, which now includes three additional processing steps: L2 smoothing (430), L1 smoothing (435), and CM compression (440). In some embodiments, CM compression may also be performed by a central post-processing node (not shown). Each of these steps will be described in more detail next.

As in the process of FIG. 3, given a sequence of $F_N$ total frames, each node (except, perhaps, the node processing the last segment of the video) (410) receives a set of frames ($F_t$) defining a segment of a fixed-interval of the video. Typical segment sizes range in length between 10 to 30 seconds. For example, at 24 fps, a segment may have a total of 720 frames or pictures. A scene can cross multiple segments and a segment can include frames from multiple scenes. In many applications, once the encoding job is dispatched to each node, it is strongly preferred not to pass information between nodes.

Figure 5:
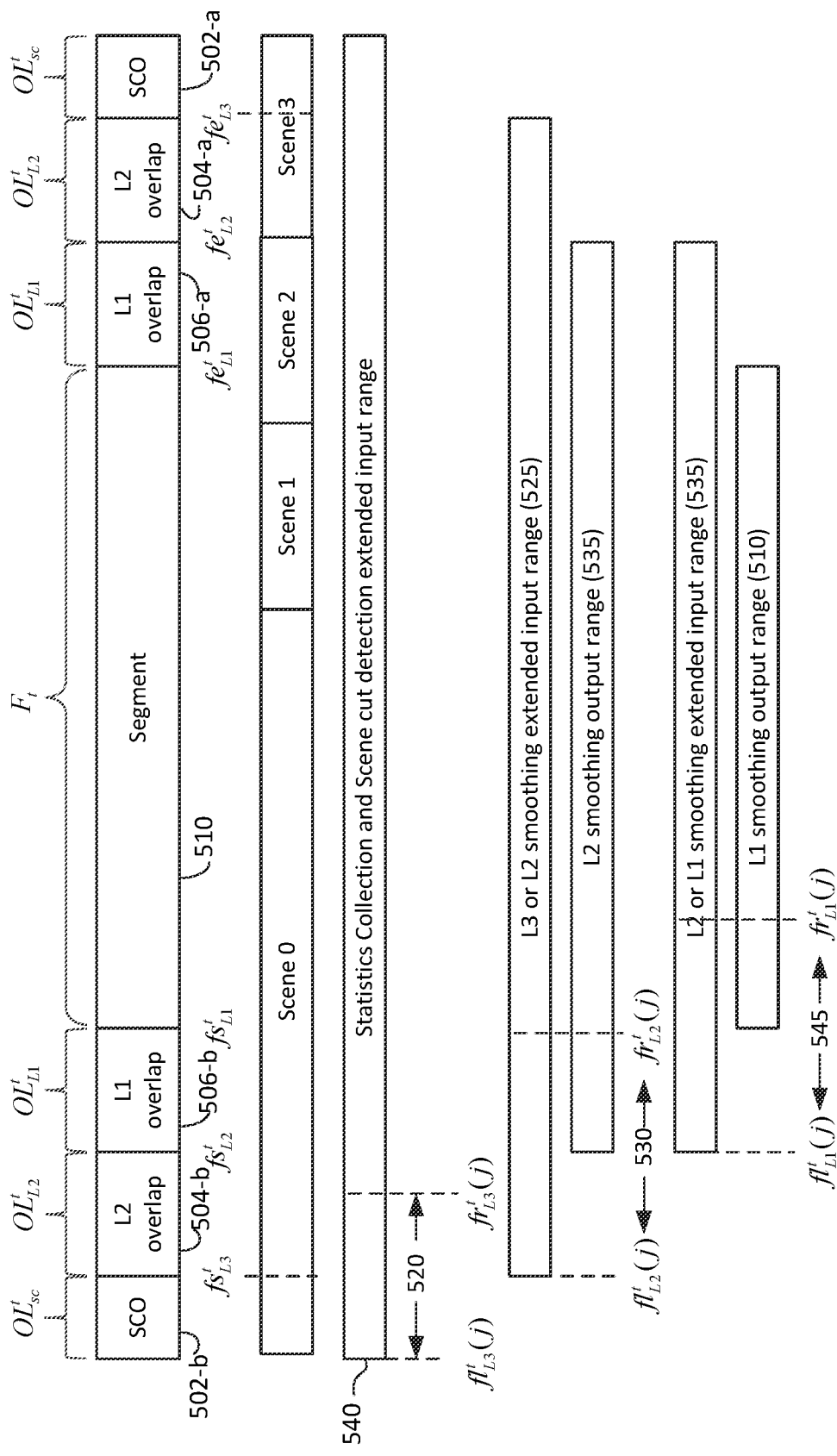
FIG. 5 depicts an example of an extended segment structure for segment-based reshaping according to an embodiment of this invention.

When a scene is split into multiple segments, an encoder encodes each sub-scene individually, via local optimization. In this scenario, discontinuity in image characteristics (such as a sudden luminance change or a sudden color change) will be observed within this scene. One approach to address this issue is by using extended or padded segments, where a padded segment may be partially processed by multiple computer nodes. For example, as depicted in FIG. 5, in an embodiment, fixed segment 510, encoded in Node t, is padded by look-back overlap sub-segments 502-b, 504-b, and 506-b, which will be encoded by Node t−1, and by look-ahead overlap segments 502-a, 504-a, and 506-a, which will be encoded in Node t+1. This approach offers better transition at the boundaries. In a preferred embodiment, to eliminate any need for inter-node communications, there is no overlapped encoding, that is, Node t will only compress frames in segment $F_t$; however, reshaping functions and composer metadata are generated based on statistics from extended or padded segments.

Denote the total number of frames in a video sequence as $F_N$. Denote the number of frames within current segment t as $F_t$. Except for the last segment, assume, without limitation, that $F_t$ is a constant for all other segments and equal to F. Denote the number of segments within a full-length video as T, then $T=\lceil F_N/F \rceil$, and the last segment will have $F_N-(T-1)F$ frames. Let j denote the frame index at the full-video-sequence level.

Denote the length for the scene cut overlap (SCO) as $OL_{sc}^t$ (502-b or 502-a), the length for the L1 smoothing overlap as $OL_{L1}^t$, (506-b or 506-a), and the length for the L2 smoothing overlap as $OL_{L2}^t$ (504-b or 504-a). Then, the overall look-ahead overlap length for each segment (e.g., 506-a+504-a+502-a) (except for the last segment) will be $$OL_{LA}^t = (t<T-1)?OL_{sc}^t + OL_{L1}^t + OL_{L2}^t : 0, \quad (9)$$

where the expression A=statement? B: C denotes that A=B if the statement is TRUE, otherwise A=C. Similarly, the overall look-back overlap length for each segment (except the first segment) will be $$OL_{LB}^t = (t>0)?OL_{sc}^t + OL_{L1}^t + OL_{L2}^t : 0. \quad (10)$$

Then, node t will receive a total number of frames (412) equal to $$F_t^t = OL_{LA}^t + F_t + OL_{LB}^t. \quad (11)$$

Using mapping (415), in each node, each of SDR frames will be converted to EDR frames (417).

In general, FIG. 5 characterizes the following segments:
Primary t, or L1 segment (510), determined by $(fs_{L1}^t \, fe_{L1}^t)$
Extended L1 segment, or L2 segment (535), determined by $(fs_{L2}^t \, fe_{L2}^t)$
Extended L2 segment, or L3 segment (525), determined by $(fs_{L3}^t \, fe_{L3}^t)$
Extended Primary t segment (540), defined by equation (11)

Scene-Cut Detection

Within each node, in step (425), scene cuts are detected for each frame j, within the range of frames in the L3 segment $(fs_{L3}^t, fe_{L3}^t)$, where:

$$fs_{L3}^t = \max\{t \cdot F - OL_{L2}^t - OL_{L1}^t, 0\},$$

$$fe_{L3}^t = \min\{(t+1) \cdot F - 1 + OL_{L2}^t + OL_{L1}^t, F_N - 1\}. \quad (12)$$

For the j-th frame, the scene-cut decision is based on a sliding scene-cut detection window (520) with $2OL_{sc}^t + 1$ frames centered at frame j (e.g., $2OL_{sc}^t + 1 = 9$). The scene-cut sliding window (520) for each frame j has a range $[fl_{L3}^t(j) \, fr_{L3}^t(j)]$, where $$fl_{L3}^t(j) = \max\{j - OL_{sc}^t, 0\},$$

$$fr_{L3}^t(j) = \min\{j + OL_{sc}^t, F_N - 1\}, \quad (13)$$

and is accessing all the frames in the full range of the Extended Primary t segment (540).

Denote the scene cut decision for each frame j within this range as $SC_j$, where, for example, $SC_j = 1$ denotes the detection of a new scene at frame j. As an example, as depicted in FIG. 5, the scene cut detection algorithm detected four scene cuts in the L3 segment (525) (Scenes 0, 1, 2, and 3).

In an embodiment, in step (420), frame-based statistics, such as $\{h_{jb}^s\}, \{h_{jb}^v\}, \{A_j\}, \{B_j\}$, are also collected within the frame range of L3 segment $(fs_{L3}^t, fe_{L3}^t)$. The next step is to smoothen out those statistics to take into consideration any scene cuts.

Level 2 Smoothing

Within each node, Level 2 smoothing (430) (to be defined later) is performed using a sliding L2 window (530) with $2OL_{L2}^t + 1$ frames (e.g., $2OL_{L2}^t + 1 = 31$) centered on each frame j and within the range of frames in the L2 segment $(fs_{L2}^t \, fe_{L2}^t)$, where $$fs_{L2}^t = \max\{t \cdot F - OL_{L1}^t, 0\},$$

$$fe_{L2}^t = \min\{(t+1) \cdot F - 1 + OL_{L1}^t, F_N - 1\}. \quad (14)$$

In an embodiment, the L2 sliding window (530) may be adjusted (bounded) according to any scene cuts detected within the extended L2 smoothing input range (525). Denote the nearest left scene cut for frame j as SE, and the nearest right scene cut for frame j as $SR_j^t$. For each frame j, the L2 sliding window has a frame range:

$$fl_{L2}^t(j) = \max\{j - OL_{L2}^t, fs_{L3}^t, SL_j^t, 0\},$$

$$fr_{L2}^t(j) = \min\{j + OL_{L2}^t, fe_{L3}^t, SR_j^t, F_N - 1\}. \quad (15)$$

As shown in Table 1, given histograms for each frame in the L3 range, L2 smoothing refers to generating histograms and other statistics for frame j based on all the frames included in the L2 sliding window centered in frame j (see equation (15)). For example, the SDR histogram for frame j may be computed as:

$$h_b^s(j) = \Sigma_{k=fl_{L2}^t(j)}^{fr_{L2}^t(j)} h_b^s(k). \quad (16)$$

Level 1 Smoothing

Within each node, L1 smoothing (435) (to be defined later) may be performed for frames within the L1 the range $(fs_{L1}^t \, fe_{L1}^t)$ (510) using an L1 sliding window (545), where $$fs_{L1}^t = t \cdot F,$$

$$fe_{L1}^t = \min\{(t+1) \cdot F - 1, F_N - 1\}. \quad (17)$$

Like the L2 sliding window, the L1 sliding window is also adjusted (bounded) according to any scene cut within its input range (535). Denote the nearest left scene cut for frame j as $SL_j^t$ and the nearest right scene cut for frame j as $SR_j^t$. For each frame j, the L1 sliding window is bounded by $$fl_{L1}^t(j) = \max\{j - OL_{L1}^t, fs_{L2}^t, SL_j^t, 0\},$$

$$fr_{L1}^t(j) = \min\{j + OL_{L1}^t, fe_{L2}^t, SR_j^t, F_N - 1\}. \quad (18)$$

As shown in Tables 2 and 3, given computed inverse luma reshaping LUTs or other statistics for each frame in the L2 range, L1 smoothing refers to generating new statistical data by for frame j based on all the frames included in the L1 sliding window centered in frame j (see equation (17)).

Luma Reshaping

Luma reshaping is performed using both L2- and L1-level smoothing.

The steps, described in more detail in pseudo-code in Tables 1 and 2, include:

a) Compute statistics in each frame of the L3 segment (e.g., $\{h_{jb}^s\}, \{h_{jb}^v\}$ and the like)

b) Apply L2 smoothing to generated L2-smoothed statistical data to generate the CDFs c) Apply CDF matching (discussed earlier) to generate inverse luma reshaping LUTs $\tilde{T}_b^j$ d) Apply L1 smoothing (e.g., averaging) to smooth the computed $\tilde{T}_b^j$ values to determine the final $T_b^j$ LUT as $$T_b^j = \frac{\sum_{k=fl_{L1}^t(j)}^{fr_{L1}^t(j)} \tilde{T}_b^k}{(fr_{L1}^t(j) - fl_{L1}^t(j) + 1)}, \quad (19)$$

which can be approximated using a piece-wise polynomial.

The windowed L1 and L2 smoothing techniques help to compensate for any false scene-cut detections and also assist later on in reducing ("compressing") the amount of composer metadata that need to be eventually transmitted by better detecting similar metadata.

TABLE 1

Luma reshaping using L2 smoothing

```
// STEP 1: initialization
h_b^s = 0 for b = 0, ..., M^S - 1
h_b^v = 0 for b = 0, ..., M^V - 1
c_b^s = 0 for b = -1, ..., M^S - 1
c_b^v = 0 for b = -1, ..., M^V - 1
// STEP 2: find L2 sliding window boundaries and build histograms
in the sliding window
fl_{L2}^t(j) = max{j - OL_{L2}^t, fs_{L3}^t, SL_j^t, 0}
fr_{L2}^t(j) = min{j + OL_{L2}^t, fe_{L3}^t, SR_j^t, F_N - 1}
for( w = fl_{L2}^t(j); w ≤ fr_{L2}^t(j) ; w ++ ){
    for( b = 0 ; b < M^S; b ++ ){
        h_b^s = h_b^s + h_{wb}^s ;      // histogram for SDR
    }
    for ( b = 0 ; b < M^V; b ++ ){
        h_b^v = h_b^v + h_{wb}^v ;      // histogram for iDM EDR
    }
}
// STEP 3: build the CDFs
for( b = 0 : b < M^S; b ++ ){
    c_b^s = c_{b-1}^s + h_b^s
}
for( b = 0 : b < M^V; b ++ ){
    c_b^v = c_{b-1}^v + h_b^v
}
// Apply CDF matching to generate Luma reshaping LUT (see Annex A)
{ \tilde{T}_g^j }
```

TABLE 2

Luma reshaping using L1 smoothing

```
// STEP 1: initialization
T_b^{L1} = 0 for b = 0, . . . , M^S - 1
// STEP 2: Find sliding window boundary and obtain average LUT
fl_{L1}^t (j) = max{ j - OL_{L1}^t, fs_{L2}^t, SL_j^t, 0}
fr_{L1}^t (j) = min{ j + OL_{L1}^t, fe_{L2}^t, SR_j^t, F_N - 1}
for( w = fl_{L1}^t (j); w ≤ fr_{L1}^t (j); w++ ){
    for ( b = 0 ; b < M^S ; b++ ){
        T_b^{L1} = T_b^{L1} + \tilde{T}_b^w; // Sum of LUTs
    }
}
// STEP 3: Average
for ( b = 0 : b < M^S; b++ )
    T_b^j = \frac{T_b^{L1}}{fr_{L1}^t(j) - fl_{L1}^t(j) + 1}
end
```

In an embodiment, chroma reshaping is performed using only L1 smoothing. An example embodiment is depicted in Table 3.

TABLE 3

Chroma reshaping with L1 smoothing

```
// determine L1 sliding window boundary
fl_{L1}^t (j) = max{ j - OL_{L1}^t, fs_{L2}^t, SL_j^t,0}
fr_{L1}^t (j) = min{ j + OL_{L1}^t, fe_{L2}^t, SR_j^t, F_N - 1}
// sum up statistics
A = \sum_{w=fl_{L1}^t(j)}^{fr_{L1}^t(j)} A_w B = \sum_{w=fl_{L1}^t(j)}^{fr_{L1}^t(j)} B_w // solve least square problem to get MMR coefficients
M^j = (A)^{-1}(B)
```

In some embodiments, when a segment includes one or more complete scenes (e.g., Scene 1 in FIG. 5), it may be possible to simplify the computations by generating composer metadata for the whole scene using the statistics generated within the L3 segment (525). In such an embodiment, L1 and L2 smoothing may be performed only for frames outside the known scenes (e.g., in FIG. 5, for frames within Scene 0 and Scenes 2 and 3). Such approach relies on more accurate scene detection. Fade-ins and fade-outs may also affect such an approach, unless a fade-in-fade-out detector is added on top of the scene-cut detector. In contrast, the sliding-window approach has better resilience in false scene-cut detection.

Composer Metadata (CM) Compression

It is desirable, especially at low bit rates, to reduce the overhead required for transmitting composer metadata. In an embodiment, during CM compression (440), the CM transmission syntax may include a composer metadata repeat flag, say, use_prev_crin_flag, which, when set to 1 indicates to the decoder that it can reuse a set of metadata which was previously transmitted. For example, for the static reshaper architecture, such a repeat flag may be transmitted for every IDR (instantaneous decoding refresh) instance. Similarly, in the two-stage distributed process, a repeat flag may be transmitted at every IDR instance and at the beginning of each new scene. For the single-stage distributed architecture, the composer metadata may change for each frame, thus a mechanism is desired to reduce the CM overhead. This CM reduction may be performed either inside each computing node (e.g., as part of the "CM compression" block (440)), or at a central, post-processing, node.

In an embodiment, even though CM may be computed for each frame, new CM data are transmitted only when there is significant difference among their values. As an example, given two backward luma reshaping functions for frames i and j, their similarity may be computed as $$S_{i,j} = \max\{|T_b^i - T_b^j|, \forall b\}. \quad (20)$$

Alternatively, one may also take into consideration the active luma ranges in each frame (e.g., $s_i^L$, $s_i^H$ and $s_j^L$, $s_j^H$) and compute the similarity only within the range [min{$s_i^L$, $s_j^L$}, max{$s_i^H$,$s_j^H$}], as in $$S_i = \max\{|T_b^i - T_b^j|, b \in [\min\{s_i^L, s_j^L\} - \delta, \max\{s_i^H, s_j^H\} + \delta]\}, \quad (21)$$

where δ (e.g., δ=0) denotes a safety margin which can be adjusted as needed, depending on the available bandwidth.

Considering a segment with F frames, in an embodiment, each segment is subdivided into sub-partitions or clusters (say, denoted as $\Theta_\alpha$), where each sub-partition may be represented by a representative anchor frame (say, Rα).

Then, when transmitting the composer metadata, only the CM data for the anchor frame of each sub-partition will be sent.

For example, given a segment, in an embodiment, one may select the first frame as its anchor frame. Then, for each subsequent frame one may compute its similarity with the anchor frame. If it is smaller than a threshold (say, $\Delta$) (e.g., $\Delta=\frac{1}{2}^{10}$), then the composer metadata may be reused, otherwise, a new cluster, with a new anchor frame is generated. The process may be repeated for all frames in the segment or for the entire sequence. Table 4 describes in pseudo code an example of this process according to an embodiment.

TABLE 4

Generation of CM clusters

```
α = 0 ;        // sub-partition counter
R_α = 0 ;      // set to store the anchor frame
Θ_α = { } ;    // set to store the frame index in each sub-partition
or CM cluster
for f = 1 : 1 : F−1
    compute similarity S_{R_α,f}
    if( S_{R_α,f} < Δ )   // within the threshold, add frame f to the current
    sub-partition
        Θ_α = Θ_α ∪ f ;
    else                  // larger than the threshold; create a new cluster
        α ++ ;
        R_α = f ;
        Θ_α = { } ;
    end
end
```

The above single-pass method is a greedy method. It simply picks as a new anchor the first frame which fails the similarity test. The processing can be easily done in a single scan; however, it might miss a better anchor frame later in the sequence. In other words, in terms of CM data, there is no need for the representative (or anchor) frame to be the first frame in a cluster.

Figure 6A:
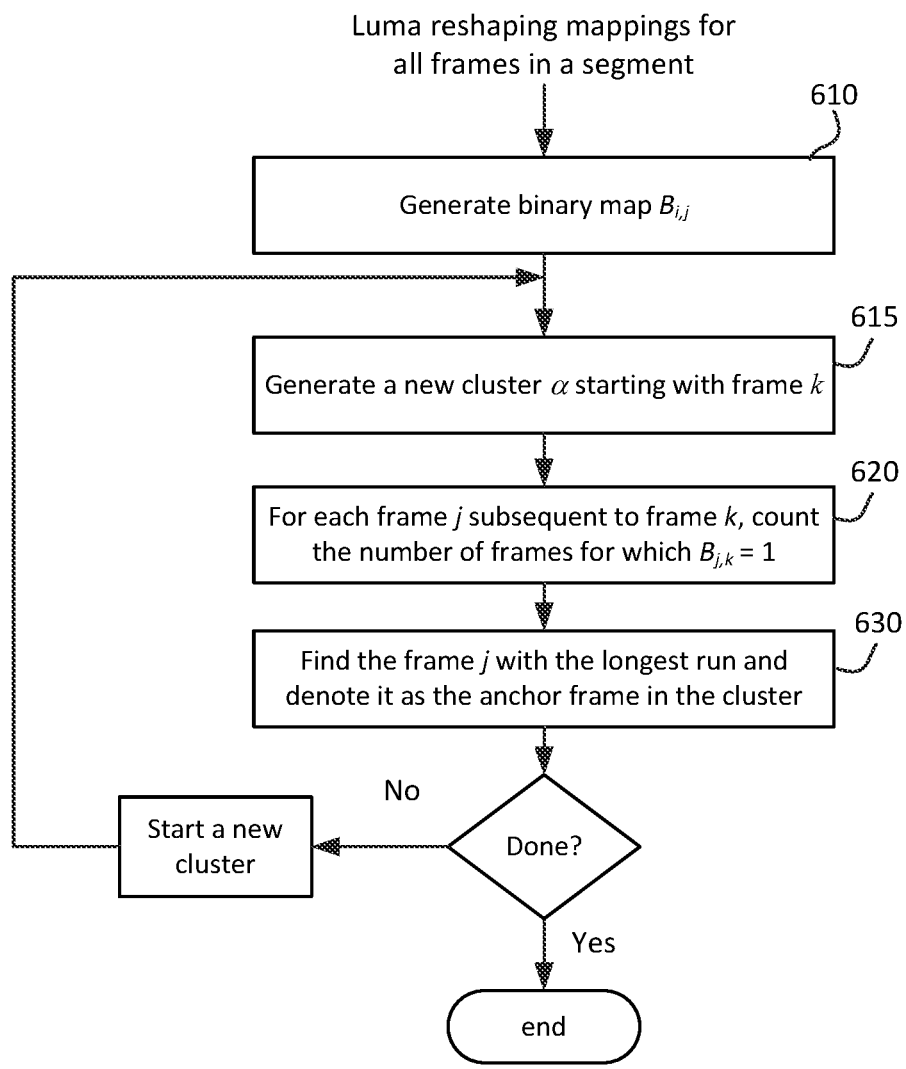
FIG. 6A depicts an example process for determining composer-metadata clusters according to an embodiment of this invention.

In an embodiment, as also depicted in FIG. 6A, a more efficient two-pass method may be used. In the first pass (610), a binary map $B_{i,j}$ is generated such that $$B_{i,j} = \begin{cases} 1, & \text{if } S_{i,j} \leq \Delta \\ 0, & \text{otherwise} \end{cases} \quad (22)$$

Then, new clusters and their anchor frames may be determined as follows:

a) (Step 615): Let k define the start frame of a new cluster $\alpha$ b) (Step 620): For each frame j after frame k, find the set of subsequent frames to frame k for which $B_{j,k}=1$ and count them; denote the count as $C_j$ $$\Pi_\alpha = \{i|B_{i,k}=1, i \geq k\}. \quad (23)$$

c) (Step 630): Find the longest run of similar frames and include them in the set of frames $\Theta_\alpha$ within the cluster $\alpha$ $$L_\alpha = \max\{C_j\} \quad (24)$$

$$\Theta_\alpha = \{j|B_{i,j}=1, j \geq k\} \quad (25)$$

d) Determine as the anchor frame the frame with the longest run $$\tilde{j} = \arg\max\{C_j\}, $$

$$R_\alpha = \Pi_\alpha[\tilde{j}] \quad (26)$$

e) Move the starting frame to next cluster, and repeat from step a) until the last frame in the segment (or video sequence)

$$k=k+L_\alpha.$$

Figure 6B:
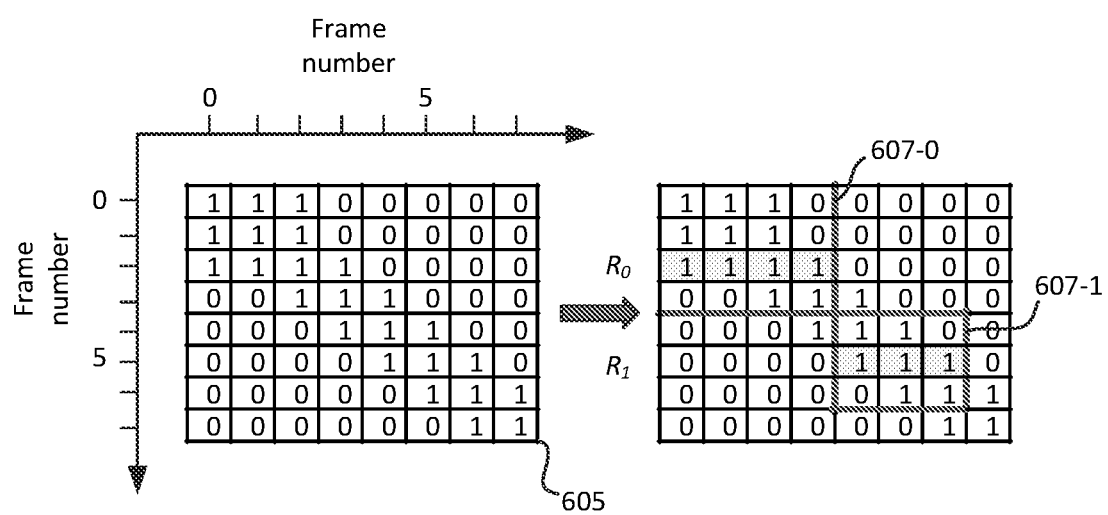
FIG. 6B depicts an example of determining composer-metadata clusters according to the process depicted in FIG. 6A.

FIG. 6B depicts an example of this process for a segment with 8 frames. Consider the binary map $B_{i,j}$ (605). For cluster 0 (607-0), the longest run of similar frames is four, and frame no. 2 is considered the anchor frame. For cluster 1 (607-1), the longest run of similar frames is three, and frame no. 1 within this cluster (or frame no. 5 in the segment) is considered the anchor frame for this cluster.

Table 5 describes in pseudo-code an example of the two pass process described above.

TABLE 5

Two-pass method to determine composer metadata clusters

```
//STEP 1:
//Compute S_{i,j} and binary map B_{i,j} from S_{i,j}
Set all S_{i,j} = 0;
Set all B_{i,j} = 0;
for( i = 0; i < F −1 ; i++){
    for( j = i + 1; j < F ; j++){
        compute S_{i,j} ;
        S_{i,j} = S_{j,i} ;
        B_{i,j} = (S_{i,j} < Δ) ;
        B_{j,i} = (S_{j,i} < Δ) ;
        // no need to continue to compute for the rest of j
        // if similarity is larger than the threshold
        if( B_{i,j} == 0 ) break;
    }
}
// STEP 2:
α = 0 ;         // number of cluster found
Θ_α = { } ;     // cluster set
k = 0;          // starting frame in current search window.
find_flag = 1;
while(find_flag == 1 ){
    // find the set of anchor frames which cover frame k.
    Π_α = {i|{(B_{i,j} = 1), ∀i ≥ k, j = k}} ;
    // compute the length of consecutive window for each anchor frame in
    the set Π_α
    For( j = 0 ; j < |Π_α| ; j ++){
        i = Π_α[j];
        C_j = 0 ;
        for( m = k ; m ≤ F−1; m++){   // find the number of
            consecutive frames
            if( B_{i,m} == 1 ) C_j ++ ;
            else break;
        }
    }
    // find the longest one which defines the best cluster
    L_α = max{C_j};
    // find the anchor frame
    j̃ = arg max{C_j};
    R_α =Π_α[j̃];
    Θ_α = {k, k + 1,...,k + L_α −1}
    // move starting frame of search window to next cluster
    k = k + L_α;
    if( k > F−1 ){
        find_flag = 0;
    }
}
```

Each of the following references is incorporated herein by reference in its entirety.

REFERENCES

[1] ITU-R BT. 1886, "Reference electro-optical transfer function for flat panel displays used in HDTV studio production," ITU, March 2011.

[2] SMPTE ST 2084:2014 "High Dynamic Range EOTF of Mastering Reference Displays," SMPTE, 2014.

[3] U.S. Pat. No. 8,811,490, "Multiple color channel multiple regression predictor," by G-M. Su, et al., 2014.
[4] U.S. Patent Application Publication 20160253792, "Guided Color Grading for an Extended Dynamic Range Image," by N. Xu et al.
[5] U.S. Patent Application Publication 20160358319, "Methods and System for Inverse Tone Mapping," by N. Xu et al.
[6] U.S. Provisional Patent Application Ser. No. 62/385,307, "Coding of High Dynamic Range Video Using Segment-Based Reshaping," by H. Kadu et al., filed on Sep. 9, 2016.

ANNEX A

Static Luma Reshaping

Denote the minimal and maximum luma values within the j-th frame of the iDM EDR image as $v_j^L$ and $v_j^H$. Denote the minimal and maximal luma values within the j-th SDR frame as $s_j^L$ and $s_j^H$.

A. Collect Statistics

```
// STEP 1: histogram initialization
h_jb^s = 0 for b = 0, ..., M^S - 1
h_jb^v = 0 for b = 0, ..., M^V - 1
// STEP 2: scan for each pixel in SDR to build histograms
for( j = 0; j < F; j++ ){
    for( i = 0 ; i < P ; i++ ){
```

$$b^S = \left\lfloor \frac{s_{ji}^y}{w_{bS}} \right\rfloor$$

$$b^V = \left\lfloor \frac{v_{ji}^y}{w_{bV}} \right\rfloor$$

```
        h_{j,b^s}^s ++; // histogram for SDR
        h_{j,b^v}^v ++; // histogram for iDM EDR
    }
}
```

B. Obtain Backward Reshaping Function

```
// STEP 1: initialization
h_b^s = 0 for b = 0, ..., M^s - 1
h_b^v = 0 for b = 0, ..., M^V - 1
c_b^s = 0 for b = -1, ..., M^s - 1
c_b^v = 0 for b = -1, ..., M^V - 1
// STEP 2: scan for each pixel in SDR to build histograms
for( j = 0; j < F; j ++ ){
    for ( b = 0 ; b < M^S ; b ++ ){
        h_b^s = h_b^s + h_{jb}^s; // histogram for SDR
    }
    for ( b = 0 ; b < M^V ; b ++ ){
        h_b^v = h_b^v + h_{jb}^v; // histogram for iDM EDR
    }
}
// STEP 3: build CDF
for( b = 0 : b < M^S; b ++ ){
    c_b^s = c_{b-1}^s + h_b^s
}
for( b = 0 : b < M^V; b ++ ){
    c_b^v = c_{b-1}^v + h_b^v
}
// STEP 4: normalized CDF to between [0 1]
for( b = 0 ; b < M^S; b ++ ){
```

$$\hat{c}_b^s = \frac{c_b^s}{P}$$

```
}
for( b = 0 ; b < M^V; b ++ ){
```

$$\hat{c}_b^v = \frac{c_b^v}{P}$$

```
}
// STEP 5: histogram transfer
for( b = 0 ; b < M^S; b ++ ){
    // for each SDR sample point, find the corresponding CDF value
    // find the iDM EDR whose CDF cover the SDR CDF
    find k such that c_{k-1}^v ≤ c_b^s ≤ c_k^v
    // find the iDM EDR sample points
    perform interpolation based on c_{k-1}^v and c_k^v
```

$$\tilde{T}_b = (k-1) + \frac{\hat{c}_b^s - \hat{c}_{k-1}^v}{\hat{c}_k^v - \hat{c}_{k-1}^v}$$

```
}
// STEP 6: curve clipping
// search flat areas at dark areas
for( b= 1; b < M^S; b ++){
    if( |T̃_b - T̃_{b-1}| > Δ){
        s^L =clip3( b-2, 0, M^S-1);
        break;
    }
}
// search flat areas at bright areas
for( b= M^S -1; b > 0; b--){
    if( |T̃_b - T̃_{b-1}| > Δ){
        s^H =clip3( b+1, 0, M^S-1);
        break;
    }
}
// STEP 7: curve smoothing using varying window sizes
//
// lower end
for( b= 0; b < s^L; b ++){
    T_b = T̃_b
}
// higher end
for( b= s^H ; b < M^S -1; b++){
    T_b = T̃_b
}
// mid-tone smoothing (e.g., W_b = 2^(2SDR_bitdepth -13))
for ( b = s^L +1 ; b < s^H ; b++){
```

$$W_b = \min\left\{b - s^L + 2, s^H - b + 2, \frac{W}{2}\right\}$$

$$W_b^- = \text{clip3}(b - W_b, 0, M^S - 1)$$
$$W_b^+ = \text{clip3}(b + W_b, 0, M^S - 1)$$

$$T_b = \frac{1}{W_b^+ - W_b^- + 1} \sum_{k=W_b^-}^{W_b^+} \tilde{T}_k$$

```
}
// STEP 8: rounding and clipping
T_b = clip3(round(T_b), 0, N^V -1);
```

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to segment-based luma and chroma reshaping of images with enhanced dynamic range, such as those described herein. The computer and/or IC may compute any of a variety of parameters or values that relate to the reshaping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to segment-based luma and/or chroma reshaping of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient segment-based luma and/or chroma reshaping of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method for segment-based luma and/or chroma reshaping with a processor, the method comprising:
  receiving an input video signal (104) in a first dynamic range;
  dividing the input video signal into segments, wherein each segment comprises primary frames (510) and padded frames, wherein for two consecutive segments padded frames for one of the segments overlap with the primary frames of the other segment;
    for a segment (412) processed by a node processor,
      converting (415) each of the primary and padded frames of the input video signal in the segment into corresponding primary and padded frames of a second video signal in a second dynamic range (417), wherein the second dynamic range is higher than the first dynamic range;
      gathering statistical data (420) based on the input video frames and the second video frames in the segment;
      collecting scene cut information (425) for the frames of the input video frames in the segment;
      generating a first sub-segment of the input video comprising the primary frames in the segment and first part of the padded frames in the segment;
      for each frame in the first sub-segment of the input video (430):
        computing a first support frame set (530) based on a first sliding window centered on the frame of the first sub-segment and adjusted based on scene cuts in the segment;
        determining a first luma mapping for mapping luminance values of the frame in the first sub-segment from the first dynamic range into the second dynamic range based on the statistical data and the first support frame set;
      for each primary frame in the segment of the input video (435):
        computing a second support frame set (545) based on a second sliding window centered on the primary frame and adjusted based on scene cuts in the segment;
        determining a second luma mapping for mapping luminance values of the primary frame from the first dynamic range into the second dynamic range based on the first mapping and the second support frame set;
        determining a chroma mapping for mapping chroma values of the primary frame from the first dynamic range into chroma values in the second dynamic range based on the statistical data and the second support frame set; and
        generating composer metadata for the frame in the segment based on the second luma mapping and the chroma mapping.

EEE 2. The method of claim 1, wherein gathering statistical data comprises:
  for a pair of images comprising a frame of the input video signal in the first dynamic range and its corresponding frame of the second video signal in the second dynamic range:
    computing a first image histogram of pixel values in the input video frame; and
    computing a second image histogram of pixel values in the second video frame.

EEE 3. The method of EEE 2, further comprising: computing $A_j = \overline{S}_j^T \overline{S}_j$, $B_j = \overline{S}_j^T V_j$, where j denotes the index of the input video frame in the input signal, T denotes matrix transposition, $V_j$ comprises pixel values of the second video frame, and $\overline{S}_j^T$ comprises values of the input video frame according to a prediction model used to generate predicted pixel values of the second video frames using pixel values of the input video frame.

EEE 4. The method of EEE 3, wherein the prediction model is expressed as:

$$\hat{V}_j = \begin{bmatrix} \hat{v}_{j0}^T \\ \hat{v}_{j1}^T \\ \vdots \\ \hat{v}_{j,P-1}^T \end{bmatrix} = \overline{S}_j M,$$

where $\hat{V}_j$ denotes the predicted pixel values of the second video frame and M denotes a matrix characterizing the prediction model.

EEE 5. The method of EEE 3 or 4, wherein, for a primary frame in the segment, computing the chroma mapping comprises:
  computing updated $A_j$ and $B_j$ values for the primary frame in the segment based on the A and B values of all frames in the second support frame set of the primary frame; and
  determining the chroma mapping based on the updated $A_j$ and $B_j$ values.

EEE 6. The method of EEE 5, wherein computing the updated $A_j$ and $B_j$ values and the chroma mapping further comprises computing:

$$A = \sum_{w=fl_{L1}^t(j)}^{fr_{L1}^t(j)} A_w,$$

$$B = \sum_{w=fl_{L1}^t(j)}^{fr_{L1}^t(j)} B_w,$$

and $M^j = (A)^{-1}(B)$, where A and B denote the updated $A_j$ and $B_j$ values for the primary frame, $M^j$ denotes the parameter matrix of the chroma mapping, and $fl_{L1}^t(j)$ $fr_{L1}^t(j)$ denote the start and end frames in the second support frame set for the primary frame in the segment.

EEE 7. The method of EEE 6, wherein the composer metadata for the chroma mapping of the frame comprise the elements of the $M^j$ matrix.

EEE 8. The method of any of EEEs 2-7, wherein, for a frame in the first sub-segment, computing the first luma mapping comprises:
  computing an updated first histogram of the frame based on the first histograms of all frames in the first support frame set of the frame in the first sub-segment;
  computing an updated second histogram of the frame based on the second histograms of all frames in the first support frame set of the frame in the first sub-segment;
  computing a first cumulative distribution function (CDF) for the frame based on the updated first histogram;
  computing a second cumulative distribution function for the frame based on the updated second histogram; and
  computing the first luma mapping based on the first and second CDFs.

EEE 9. The method of EEE 8, wherein, for a primary frame in the segment, computing the second luma mapping comprises:
  computing the second luma mapping for the primary frame by averaging the first luma mappings of all frames in the second support frame set of the primary frame.

EEE 10. The method of EEE 9, wherein generating composer metadata for the frame based on the second luma mapping comprises:
  representing the second luma mapping as a parametric representation of a piece-wise function.

EEE 11. The method of any of EEEs 1-10, further comprising reducing the amount of metadata transmitted for the segment by applying a composer metadata compression step, wherein the composer metadata compression step comprises:

dividing the primary frames of the segment into non-overlapping clusters of frames;
  determining an anchor frame within each cluster; and
  transmitting composer metadata only for the anchor frame in each cluster.

EEE 12. The method of EEE 11, wherein dividing the primary frames into clusters comprises:
  denoting the first primary frame of the segment as the first anchor frame of the first cluster;
  for each subsequent primary frame in the segment, computing a similarity measure between the subsequent frame and the first anchor frame;
  if the similarity measure is below a threshold, then assigning the subsequent frame to the first cluster, otherwise, generating a new cluster, wherein the subsequent frame is denoted as the anchor frame of the new cluster.

EEE 13. The method of EEE 11 or 12, wherein dividing the primary frames into clusters comprises:
  generating a binary map ($B_{i,j}$) for the frames in the segment, wherein an element (i,j) of the binary map equal to 1 represents that a similarity measure between frames i and j in the segment is below a threshold;
  a) Let k denote the start frame of a new cluster or,
  b) for each frame j after frame k, find the set of subsequent frames to frame k for which $B_{j,k}=1$ and count them;
  c) based on step b), find the longest run of similar frames and include them in the set of frames within the cluster $\zeta$; and
  d) denote as the anchor frame the frame with the longest run.

EEE 14. A method for segment-based luma and/or chroma reshaping with one or more processors, the method comprising:
  receiving an input video signal (104) in a first dynamic range;
  dividing the input video signal into segments (312);
  for a segment (312) processed by a node processor,
    converting (315) each frame of the input video signal in the segment into a corresponding frame of a second video signal in a second dynamic range (317), wherein the second dynamic range is higher than the first dynamic range;
    generating statistical data (319) based on the input video frames and the second video frames in the segment;
    collecting scene cut information (314) for the frames of the input video frames in the segment; and
  in a post-processor:
    identifying a scene boundary (325) based the scene cut information from one or more segments;
    generating updated statistics based on the generated statistics of all frames within the scene boundary;
    determining a luma mapping (330) for mapping luminance values of the frames within the scene boundary from the first dynamic range into the second dynamic range based on the updated statistics;
    determining a chroma mapping (330) for mapping chroma values of the frames within the scene boundary from the first dynamic range into the second dynamic range based on the updated statistics; and
    generating composer metadata for the frames within the scene boundary based on the luma mapping and the chroma mapping.

EEE 15. The method of EEE 14, wherein gathering statistical data comprises:
for a pair of images comprising a frame of the input video signal in the first dynamic range and its corresponding frame of the second video signal in the second dynamic range:
computing a first image histogram of pixel values in the input video frame; and
computing a second image histogram of pixel values in the second video frame.

EEE 16. The method of EEE 15, further comprising: computing $$A_j = \overline{S}_j / \overline{S}_j,$$

$$B_j = \overline{S}_j^T V_j,$$

where j denotes the index of the input video frame in the input signal, T denotes matrix transposition, $V_j$ comprises pixel values of the second video frame, and $\overline{S}_j^T$ comprises values of the input video frame according to a prediction model used to generate predicted pixel values of the second video frames using pixel values of the input video frame.

EEE 17. The method of EEE 16, wherein the prediction model is expressed as:

$$\hat{V}_j = \begin{bmatrix} \hat{v}_{j,0}^T \\ \hat{v}_{j,1}^T \\ \vdots \\ \hat{v}_{j,P-1}^T \end{bmatrix} = \overline{S}_j M,$$

wherein $\hat{V}_j$ denotes the predicted pixel values of the second video frame and M denotes a matrix characterizing the prediction model.

EEE 18. The method of EEE 16 or 17, wherein, for a frame within the scene boundary, computing the chroma mapping comprises:
computing updated $A_j$ and $B_j$ values for the primary frame in the segment based on the $A_j$ and $B_j$ values of all frames within the scene boundary; and
determining the chroma mapping based on the updated $A_j$ and $B_j$ values.

EEE 19. The method of any of EEEs 15-18, wherein, for a frame within the scene boundary, computing the luma mapping comprises:
computing an updated first histogram of the frame based on the first histograms of all frames within the scene boundary;
computing an updated second histogram of the frame based on the second histograms of all frames within the scene boundary;
computing a first cumulative distribution function (CDF) for the frame based on the updated first histogram;
computing a second cumulative distribution function for the frame based on the updated second histogram; and
computing the luma mapping based on the first and second CDFs.

EEE 20. An apparatus comprising a processor and configured to perform any one of the methods recited in EEEs 1-19.

EEE 21. A non-transitory computer-readable storage medium having stored thereon computer-executable instruction for executing a method in accordance with any of the EEEs 1-19.

The invention claimed is:

1. A method for segment-based luma and/or chroma reshaping with a processor, the method comprising:
receiving an input video signal in a first dynamic range;
dividing the input video signal into segments, wherein each segment comprises a sequence of consecutive primary frames of fixed length and one or more blocks of consecutive secondary frames, wherein for two consecutive segments, secondary frames for one of the segments overlap with the primary frames of the other segment, wherein each segment of the video input signal comprises, except for a first segment, a leading look-back block of consecutive secondary frames forming two look-back overlap sub-segments and a look-back scene cut overlap sub-segment, followed by the sequence of consecutive primary frames and, except for a last segment, a trailing look-ahead block of consecutive secondary frames forming two look-ahead overlap sub-segments and a look-ahead scene cut overlap sub-segment;
for a segment processed by a node processor,
converting each of the primary and secondary frames of the input video signal in the segment into corresponding primary and secondary frames of a second video signal in a second dynamic range, wherein the second dynamic range is higher than the first dynamic range;
gathering statistical data of pixel values of the input video frames and the secondary video frames in the segment comprising:
computing histograms for the luminance pixel values of the input video frames and the secondary video frames in the segment;
collecting scene cut information for the frames of the input video frames in the segment;
generating a first sub-segment of consecutive frames of the input video signal comprising the primary frames in the segment and a first part of the secondary frames in the segment, wherein gathering statistical data of pixel values of the input video frames and the secondary video frames in the segment further comprises:
computing first histograms of the luminance pixel values of the input video frames in the first sub-segment; and
computing second histograms of the luminance pixel values of the corresponding secondary video frames;
for each frame in the first sub-segment of the input video:
smoothing the gathered statistical data of the pixel values of the input video frames and the secondary video frames over a first sliding window, the first sliding window being centered on a frame of the first sub-segment and bounded according to any scene cuts in the segment detected within the input frame range, wherein the first sliding window has a frame range depending on a smoothing overlap $0L'_L 2$, a nearest left scene cut $SL'_j$ for the frame of the first sub-segment and a nearest right scene cut $SR'_j$ for the frame of the first sub-segment, and wherein smoothing includes generating a smoothed first histogram and a smoothed second histogram for the frame in the first sub-segment based on the first histograms and the second histograms;
determining a first luma mapping for mapping luminance values of the frame in the first sub-segment from the first dynamic range into the second dynamic range based on the smoothed statistical data, wherein for a frame in the first sub-segment, computing the first luma mapping comprises:
  computing a first cumulative distribution function (CDF) for the frame based on the smoothed first histogram;
  computing a second cumulative distribution function for the frame based on the smoothed second histogram; and
  computing the first luma mapping based on matching the first and second CDFs;
for each primary frame in the segment of the input video:
  smoothing the first luma mapping over a second sliding window, the second sliding window being centered on a primary frame and bounded according to any scene cuts in the segment detected within the input frame range, wherein the second sliding window has a frame range depending on the smoothing overlap $OL'_{L1}$, the nearest left scene cut $SL'_j$ for the primary frame and the nearest right scene cut $SR'_j$ for the primary frame, to determine a second luma mapping for mapping luminance values of the primary frame from the first dynamic range into the second dynamic range;
  determining a chroma mapping for mapping chroma values of the primary frame from the first dynamic range into chroma values in the second dynamic range based on the statistical data and a multivariate, multiple regression (MMR) prediction model, and smoothing the chroma mapping over the second sliding window; and
  generating composer metadata for the frame in the segment based on the second luma mapping and the chroma mapping, wherein the composer metadata comprise a parametric representation of the second luma mapping and a backward reshaping matrix M.

2. The method of claim 1, wherein gathering statistical data comprises:
  for a pair of images comprising a frame of the input video signal in the first dynamic range and its corresponding frame of the second video signal in the second dynamic range:
    computing a first image histogram of pixel values in the input video frame; and
    computing a second image histogram of pixel values in the second video frame.

3. The method of claim 2, further comprising: computing $$A_j = \overline{S}_j^T \overline{S}_j,$$

$$B_j = \overline{S}_j^T V_j,$$

where j denotes the index of the input video frame in the input signal, T denotes matrix transposition, $V_j$ comprises pixel values of the second video frame, and $\overline{S}_j^T$ comprises values of the input video frame according to the MMR prediction model used to generate predicted pixel values of the secondary video frames using pixel values of the input video frame.

4. The method of claim 3, wherein the prediction model is expressed as:

$$\hat{V}_j = \begin{bmatrix} \hat{v}_{j,0}^T \\ \hat{v}_{j,1}^T \\ \vdots \\ \hat{v}_{j,P-1}^T \end{bmatrix} = \overline{S}_j M,$$

where $\hat{V}_j$ denotes the predicted pixel values of the second video frame and M denotes the backward reshaping matrix characterizing the prediction model.

5. The method of claim 3, wherein, for a primary frame in the segment, smoothing the chroma mapping comprises:
  computing updated $A_j$ and $B_j$ values for the primary frame in the segment based on the $A_j$ and $B_j$ values of all frames in the second sliding window; and
  determining the smoothed chroma mapping based on the updated $A_j$ and $B_j$ values.

6. The method of claim 5, wherein computing the updated $A_j$ and $B_j$ values and determining the smoothed chroma mapping further comprises computing:

$$A = \sum_{w=fl_{L1}^t(j)}^{fr_{L1}^t(j)} A_w,$$

$$B = \sum_{w=fl_{L1}^t(j)}^{fr_{L1}^t(j)} B_w,$$

and $M^j = (A)^{-1}(B)$, where A and B denote the updated $A_j$ and $B_j$ values for the primary frame, $M^j$ denotes the parameter matrix of the smoothed chroma mapping, and $fl_{L_i}'(j)$ and $fr_{L1}'(j)$ denote the start and end frames of the second sliding window.

7. The method of claim 6, wherein the composer metadata for the chroma mapping of the frame comprise the elements of the $M^j$ matrix.

8. The method of claim 1, wherein,
  smoothing the first luma mapping over the second sliding window comprises averaging the first luma mapping over the second sliding window.

9. The method of claim 1, wherein generating composer metadata for the frame based on the second luma mapping comprises:
  representing the second luma mapping as a parametric representation of a piece-wise function.

10. The method of claim 1, further comprising reducing the amount of metadata transmitted for the segment by applying a composer metadata compression step, wherein the composer metadata compression step comprises:
  dividing the primary frames of the segment into non-overlapping clusters of frames;
  determining an anchor frame within each cluster; and
  transmitting composer metadata only for the anchor frame in each cluster.

11. The method of claim 10, wherein dividing the primary frames into clusters comprises:
  denoting the first primary frame of the segment as the first anchor frame of the first cluster;

for each subsequent primary frame in the segment, computing a similarity measure between the subsequent frame and the first anchor frame;

if the similarity measure is below a threshold, then assigning the subsequent frame to the first cluster, otherwise, generating a new cluster, wherein the subsequent frame is denoted as the anchor frame of the new cluster.

12. The method of claim 10, wherein dividing the primary frames into clusters comprises:

generating a binary map ($B_{i,j}$) for the frames in the segment, wherein an element (i,j) of the binary map equal to 1 represents that a similarity measure between frames i and j in the segment is below a threshold;

a) Let k denote the start frame of a new cluster $\alpha$;

b) for each frame j after frame k, find the set of subsequent frames to frame k for which $B_{j,k}=1$ and count them;

c) based on step b), find the longest run of similar frames and include them in the set of frames within the cluster $\alpha$; and d) denote as the anchor frame the frame with the longest run.

13. An apparatus comprising a processor and configured to perform the method recited in claim 1.

14. A non-transitory computer-readable storage medium having stored thereon computer-executable instruction for executing a method in accordance with the method of claim 1.

* * * * *